US008886381B2

(12) United States Patent
Ozaki

(10) Patent No.: US 8,886,381 B2
(45) Date of Patent: Nov. 11, 2014

(54) ELECTRIC VEHICLE

(75) Inventor: Takayoshi Ozaki, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/003,350

(22) PCT Filed: Mar. 5, 2012

(86) PCT No.: PCT/JP2012/055532
§ 371 (c)(1),
(2), (4) Date: Sep. 5, 2013

(87) PCT Pub. No.: WO2012/121198
PCT Pub. Date: Sep. 13, 2012

(65) Prior Publication Data

US 2013/0345917 A1 Dec. 26, 2013

(30) Foreign Application Priority Data

Mar. 7, 2011 (JP) ................................ 2011-048631

(51) Int. Cl.
*B60L 15/20* (2006.01)
*B60L 3/10* (2006.01)

(52) U.S. Cl.
CPC ........... *B60L 15/20* (2013.01); *B60L 2240/463* (2013.01); *Y02T 10/7258* (2013.01); *B60L 3/106* (2013.01)
USPC ............................ 701/22; 180/65.1; 180/65.7

(58) Field of Classification Search
CPC ................. B60K 28/16; B60K 7/0007; B60K 2007/0038; B60K 17/046; B60K 2007/0092; B60T 8/175; B60L 15/00; B60L 15/20; B60L 11/00; B60L 3/104; B60L 15/2081; B60L 3/108; B60L 3/102; B60L 2220/44; B60L 3/106; Y02T 10/7258
USPC ............... 701/22, 36, 37, 174, 82, 84, 87, 90; 180/65.1, 65.51, 65.6, 65.7, 65.8, 197
See application file for complete search history.

(56) References Cited

U.S. PATENT DOCUMENTS 4,766,967 A 8/1988 Slicker et al.
5,406,486 A 4/1995 Kamio et al.

(Continued)

FOREIGN PATENT DOCUMENTS

JP 2006-258289 9/2006
JP 2008-172935 7/2008

(Continued)

OTHER PUBLICATIONS

PCT International Preliminary Report on Patentability mailed Sep. 19, 2013 in corresponding International Application No. PCT/JP2012/055532.

(Continued)

*Primary Examiner* — Richard Camby

(57) ABSTRACT

An electric vehicle includes a slip ratio estimator that estimates a slip ratio based on rotational frequencies of respective driven and drive wheels. The vehicle also includes a disturbance observer that determines an estimate of a torque attributable to external force. The vehicle also includes an estimator that may estimate an entire torque to the drive wheel, based on a motor torque command value and the estimate of torque. The vehicle also includes an estimator that estimates a coefficient of friction between a road surface and a tire, based on the entire torque and the slip ratio. The vehicle also includes a determiner that determines a maximum acceptable torque Tmax, based on the coefficient of friction and a vertical load component. Torque limitation is performed such that the motor torque command value does not exceed the maximum acceptable torque Tmax.

6 Claims, 9 Drawing Sheets

FRONT REAR BATT PRIMARY ECU MOTOR CONT PWR CKT CUR SNSR EPS M DISP OP PNL OTHER AUX SYS BRK CONT H/B R/D M

A: TIRE ROT FREQ
B: ACC SIG
C: CORNERING SIG
D: DCC SIG
E: IWM SYS INFO
F: ACC/DCC CMD
G: CUR CMD
H: MOTOR CUR
I : ROTOR ANG

(56) References Cited

U.S. PATENT DOCUMENTS

| | | | | |
|---|---|---|---|---|
| 5,867,803 | A | 2/1999 | Kim et al. | |
| 6,061,622 | A | 5/2000 | Probst | |
| 6,182,003 | B1 | 1/2001 | Maier-Landgrebe | |
| 7,203,578 | B2 * | 4/2007 | Kuang et al. | 701/22 |
| 7,424,359 | B2 * | 9/2008 | Fuchs et al. | 701/82 |
| 8,046,124 | B2 | 10/2011 | Muta et al. | |
| 8,335,625 | B2 | 12/2012 | Yamaguchi et al. | |
| 2003/0171869 | A1 | 9/2003 | Potter et al. | |
| 2004/0176899 | A1 | 9/2004 | Hallowell | |
| 2005/0080547 | A1 | 4/2005 | Scelers et al. | |
| 2006/0237244 | A1 | 10/2006 | Hommi | |
| 2008/0234911 | A1 | 9/2008 | Matsuno et al. | |
| 2009/0101428 | A1 * | 4/2009 | Itoh | 180/197 |
| 2009/0210128 | A1 | 8/2009 | Fujimoto et al. | |
| 2010/0094495 | A1 | 4/2010 | Fujimoto et al. | |
| 2011/0288702 | A1 | 11/2011 | Falkestein | |

FOREIGN PATENT DOCUMENTS

| | | |
|---|---|---|
| JP | 2009-55703 | 3/2009 |
| JP | 2010-51160 | 3/2010 |
| JP | 2010-201995 | 9/2010 |
| JP | 2010-236883 | 10/2010 |

OTHER PUBLICATIONS

U.S. Appl. No. 14/003,346, filed Sep. 5, 2013, Takayoshi Ozaki.

International Search Report mailed May 29, 2012 in corresponding International Application No. PCT/JP2012/055532.

Notice of Allowance mailed May 19, 2014 in U.S. Appl. No. 14/003,346.

* cited by examiner

REAR
FRONT
H/B
R/D
M
CUR SNSR
PWR CKT
MOTOR CONT
PRIMARY ECU
BATT
BRK CONT
OTHER AUX SYS
EPS M
OP PNL
DISP
A: TIRE ROT FREQ
B: ACC SIG
C: CORNERING SIG
D: DCC SIG
E: IWM SYS INFO
F: ACC/DCC CMD
G: CUR CMD
H: MOTOR CUR
I: ROTOR ANG 21
48
16
16a
17
17a
ECU
TORQUE ALLOCATOR
INVERTER UNITS ASSIGNED TO OTHER MOTORS
22
BRAKING CONTROLLER
23
22
INVERTER UNIT
29
MOTOR CONTROL CKT
POWER CKT
28
PWM DRIVER
INVERTER
31
32
35
2
9
36
41
24
30
4 7 6
8

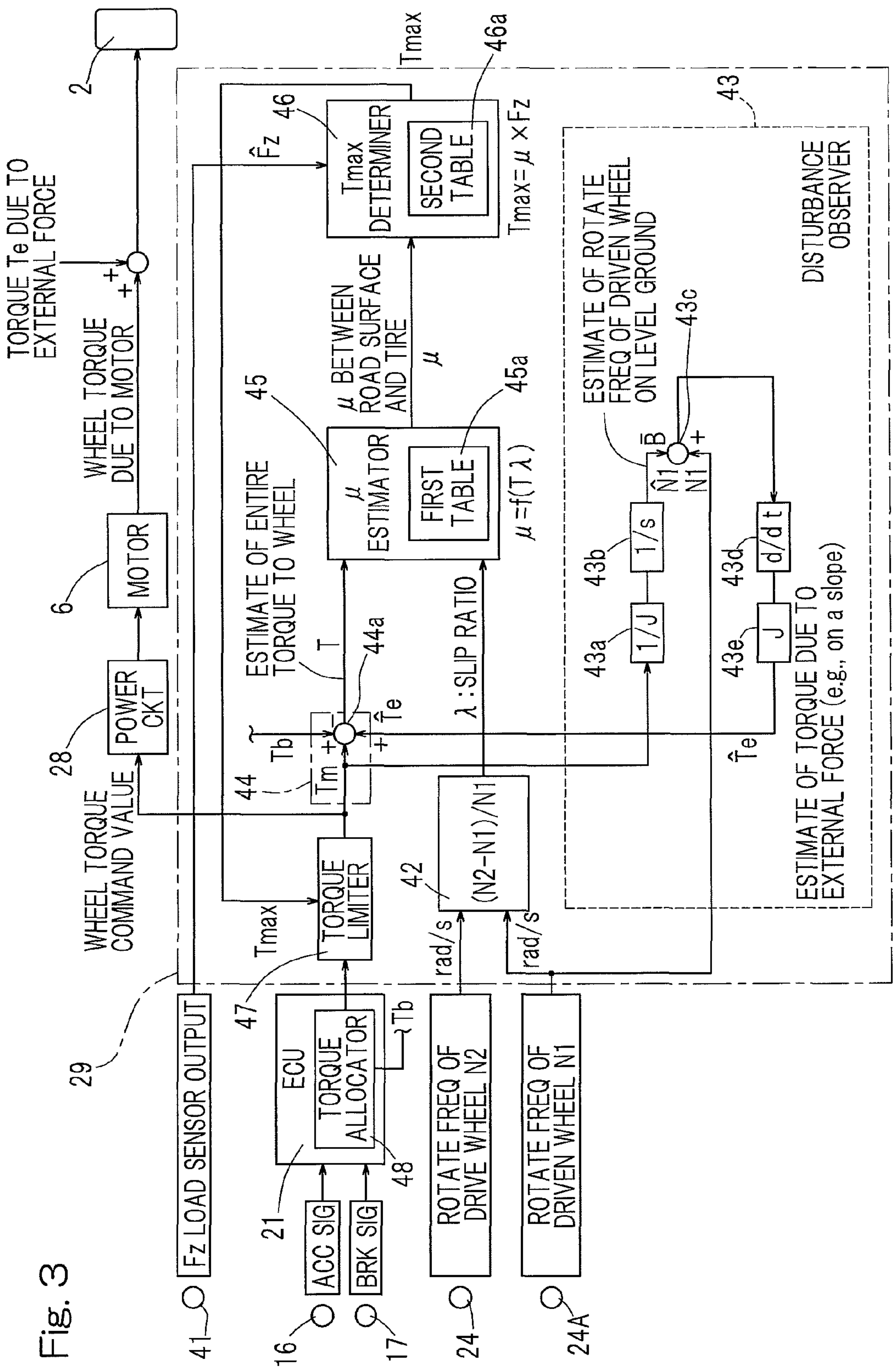
Fig. 3
41
16
17
24
24A
Fz LOAD SENSOR OUTPUT
ACC SIG
BRK SIG
ROTATE FREQ OF DRIVE WHEEL N2
ROTATE FREQ OF DRIVEN WHEEL N1
21
ECU
TORQUE ALLOCATOR
48
Tb
29
47
TORQUE LIMITER
Tmax
WHEEL TORQUE COMMAND VALUE
28
POWER CKT
6
MOTOR
WHEEL TORQUE DUE TO MOTOR
TORQUE Te DUE TO EXTERNAL FORCE
2
42
(N2-N1)/N1
rad/s
rad/s
λ : SLIP RATIO
44
Tm
Tb
44a
T̂e
T
ESTIMATE OF ENTIRE TORQUE TO WHEEL
45
μ ESTIMATOR
FIRST TABLE
45a
μ=f(Tλ)
μ BETWEEN ROAD SURFACE AND TIRE
μ
46
Tmax DETERMINER
SECOND TABLE
46a
Tmax=μ×Fz
F̂z
Tmax
43
DISTURBANCE OBSERVER
ESTIMATE OF ROTATE FREQ OF DRIVEN WHEEL ON LEVEL GROUND
43c
B̄
N̂1
N1
43a
1/J
43b
1/s
43d
d/dt
43e
J
T̂e
ESTIMATE OF TORQUE DUE TO EXTERNAL FORCE (e.g., on a slope)

CONTENT OF FIRST TABLE

CONTENT OF SECOND TABLE 8
99
4
7
73
77
78
72
VII
83a
120
65
83b
86
59a
51a
89
64
88
94
71
63
51
80
70b
36
79
70
70a
75
52
59
60
55
91
82a
61
54
82b
68
57
56
76
82
74
66
67
53
90
85
91
84b
84a
89
6
OUTBOARD SIDE
INBOARD SIDE 88
86
84b
7
83b
84a
85
89
82
82b
82a 7
83b
86
86
92
92a
84a
84b
89
93a
93
88
88
82b
85

ELECTRIC VEHICLE

CROSS REFERENCE TO THE RELATED APPLICATIONS

This application is a U.S. national stage application of PCT/JP2012/055532, filed Mar. 5, 2012, and is based on and claims the foreign priority benefit of Japanese patent application No. 2011-048631, filed Mar. 7, 2011,in the Japanese Intellectual Property Office, the entire disclosure of both of which are herein incorporated by reference as a part of this application.

BACKGROUND OF THE INVENTION 1. (Field of the Invention)

The present invention relates to an electric vehicle, such as an in-wheel motor vehicle, that is equipped with motor(s) to drive wheels and that may be battery-powered or fuel cell-powered.

2. (Description of Related Art)

A motor used in an electric vehicle may be superior to an internal combustion engine in terms of response characteristics. In an in-wheel motor electric vehicle, each wheel may be provided with such a highly responsive motor that operates independently of other motor(s).

[Patent Document 1] JP Laid-open Patent Publication No. 2008-172935

SUMMARY OF THE INVENTION

As noted above, an electric vehicle may include highly responsive motor(s). However, such highly responsive motor(s) may undesirably cause sudden increase of rotation of tire(s) when the tire(s) lose(s) contact with a road surface due to, for example, slip of the tire(s). Hence, sudden increase of rotation of a motor that may occur in response to slip may jeopardize the stable travel of a vehicle. In order to address this, it may be contemplated to limit a torque command value to a motor when needed.

Note that the conditions of a road surface as well as the coefficient of friction between the road surface and tire(s) may vary depending on the presence or absence of pavement, the type of pavement, the wet condition of the road surface caused by raining, and etc. Thus, limiting a motor torque command value in a uniform fashion throughout different conditions may often result in unnecessary limitation of torque, thus jeopardizing the travel performance of the vehicle.

An object of the present invention is to provide an electric vehicle that can properly prevent possible slip of tire(s) regardless of, for example, various road conditions, and that can ensure such prevention of possible slip without having to undesirably hinder the travel performance of the vehicle to prevent such slip.

The present invention may provide an electric vehicle which includes a motor unit 6 configured to drive a drive wheel 2. The electric vehicle also includes a motor control circuitry 29 configured to control the motor unit 6 in accordance with a motor torque command value that is generated based on signals produced from an acceleration manipulation unit 16 and a deceleration manipulation unit 17. The acceleration manipulation unit 16 may include an accelerator pedal. The electric vehicle also includes a slip ratio estimator 42 configured to estimate a slip ratio of the drive wheel on a road surface, based on a detection value indicating a travel speed of the vehicle and a rotational frequency of the drive wheel. The electric vehicle also includes a disturbance observer 43 configured to estimate a torque that is attributable to external force that acts on the vehicle, based on the detection value indicating a travel speed of the vehicle and the motor torque command value. The electric vehicle also includes an applied torque estimator 44 configured to estimate an entire torque applied to the drive wheel 2, based on (i) the motor torque command value or a motor torque value that may be converted from a motor current value of the motor unit and (ii) the torque estimated by the disturbance observer that is attributable to external force. The electric vehicle also includes a coefficient of friction estimator 45 configured to estimate a coefficient of friction between a road surface and a tire of the drive wheel 2, based on the torque estimated by the applied torque estimator 44 and the slip ratio estimated by the slip ratio estimator 42. The electric vehicle also includes a maximum acceptable torque determiner 46 configured to determine, according to a predefine rule or relation, a maximum acceptable torque, based on the estimated coefficient of friction and a vertical load component acting on the drive wheel 2. The electric vehicle also includes a motor torque command value limiter 47 configured to limit, based on the determined maximum acceptable torque, the motor torque command value to the motor unit 6 that is generated responsively to the acceleration manipulation unit 16 and the deceleration manipulation unit 17.

In the aforementioned configuration, the slip ratio estimator 42 may estimate a slip ratio of the drive wheel 2 on a road surface, based on a detection value indicating a travel speed of the vehicle and a rotational frequency of the drive wheel. The disturbance observer 43 may estimate a torque that is attributable to external force such as gravitational force that acts on the vehicle, based on the detection value indicating a travel speed of the vehicle and the motor torque command value. The applied torque estimator 44 may estimate an entire torque applied to the drive wheel, based on (i) the motor torque command value or a motor current value of the motor unit and (ii) the torque estimated by the disturbance observer that is attributable to external force. The coefficient of friction estimator 45 may estimate, according to a predefined rule or relation, a coefficient of friction between a road surface and a tire of the drive wheel 2, based on the estimated entire torque applied to the drive wheel 2 and the estimated slip ratio. The maximum acceptable torque determiner 46 may determine, according to a predefine rule or relation, a maximum acceptable torque, based on the estimated coefficient of friction and a vertical load component acting on the drive wheel 2. The motor torque command value limiter 47 may limit, based on the determined maximum acceptable torque, the motor torque command value to the motor unit 6 that is generated responsively to the acceleration manipulation unit 16 and the deceleration manipulation unit 17.

In this way, a sum of (i) a motor torque command value Tm or a motor torque value that may be converted from a motor current value of the motor unit and (ii) an estimate $\hat{T}e$ of torque estimated by the disturbance observer 43 attributable to external force that may be due to or may result from, for example, the body weight of the vehicle may be calculated. A coefficient $\mu$of friction between a road surface and a tire of the drive wheel 2 may be estimated based on the sum and an estimated slip ratio $\lambda$. A maximum acceptable torque Tmax may be determined based on the estimated coefficient $\mu$ of friction and a vertical load component $\hat{F}z$, to perform torque limitation such that the motor torque command value Tm does not exceed the maximum acceptable torque Tmax. This can properly preventing possible slip of tire(s) regardless of, for example, various road conditions, and can also ensure such prevention of possible slip without having to undesirably hinder the travel performance of the vehicle to prevent such slip.

Note that the aforementioned control may be used to implement slip-responsive control during the straight driving of the vehicle. On the other hand, slip-responsive control when traveling on a curved road may be implemented by the combination of the aforementioned slip-responsive control and an additional appropriate control that may be performed based on the curvature of the particular curved road.

A wheel bearing unit 4 as well as a load sensor 41 configured to determine the vertical load component acting on the drive wheel 2 may further be provided, wherein the load sensor 41 may be mounted on the wheel bearing unit 4. Such a configuration of a load sensor 41 being mounted on the wheel bearing unit 4 enhances the accuracy in determining the vertical load component Fz acting on the drive wheel 2, thus enabling more proper determination of the maximum acceptable torque Tmax. Such a configuration can also realize a smaller configuration to determine a load. Furthermore, such a configuration allows for pre-mounting the wheel bearing unit 4 with a load sensor 41, thus providing a load sensor-equipped wheel bearing unit. This can eliminate the step of mounting a load sensor 41 on the wheel bearing unit 4 in an assembly process of the vehicle.

The motor torque command value limiter 47 may comprise a torque limiter. A torque limiter can achieve, with a simplified configuration or construction, proper limitation of a motor torque command value.

In the present invention, a wheel bearing unit 4 may further be provided, wherein the motor unit 6, together with the wheel bearing unit 4, may form an in-wheel motor drive system 8 that is partly or entirely disposed within the drive wheel 2, with the in-wheel motor drive system 8 including the motor unit 6 and the wheel bearing unit 4. A reducer unit 7 may further be provided which is configured to transmit to the drive wheel 2 rotation with a speed that is reduced with respect to that of rotation of the motor unit 6, wherein the in-wheel motor drive system 8 may also include the reducer unit 7. The reducer unit 7 may comprise a cycloidal reducer.

In an electric vehicle with an in-wheel motor drive system 8, each drive wheel 2 may be driven, independently of other drive wheel(s) 2, with a highly responsive motor unit 6. Thus, the stable travel of such a vehicle may considerably depend on whether appropriate slip-responsive control of the drive wheel(s) 2 can be performed. In such a situation, the present invention can be effective by properly preventing possible slip of tire(s) regardless of, for example, various road conditions, and ensuring such prevention of possible slip without having to undesirably hinder the travel performance of the vehicle to prevent such slip.

In a configuration where the in-wheel motor drive system 8 includes a reducer unit 7 configured to transmit to a drive wheel 2 rotation with a speed that is reduced with respect to that of rotation of the motor unit 6, and/or in a configuration where the reducer unit 7 comprises a cycloidal reducer having a significant reduction ratio, the provision of a smaller motor unit 6 can be possible. This, however, may result in the torque generated by the motor unit 6 being transmitted in correspondingly amplified form to the drive wheel 2. In such a situation, it may be more urgent to prevent possible slip of the drive wheel 2.

The present invention encompasses any combination of at least two features disclosed in the claims, the specification and/or the drawings. In particular, the present invention encompasses any combination of at least two claims.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, as defined by the appended claims. In the accompanying drawings, like reference numerals are used to denote like parts throughout the several views, and:

FIG. 3 is a block diagram of a schematic configuration of a motor control circuitry for the electric vehicle;

DESCRIPTION OF THE EMBODIMENTS

Figure 1:
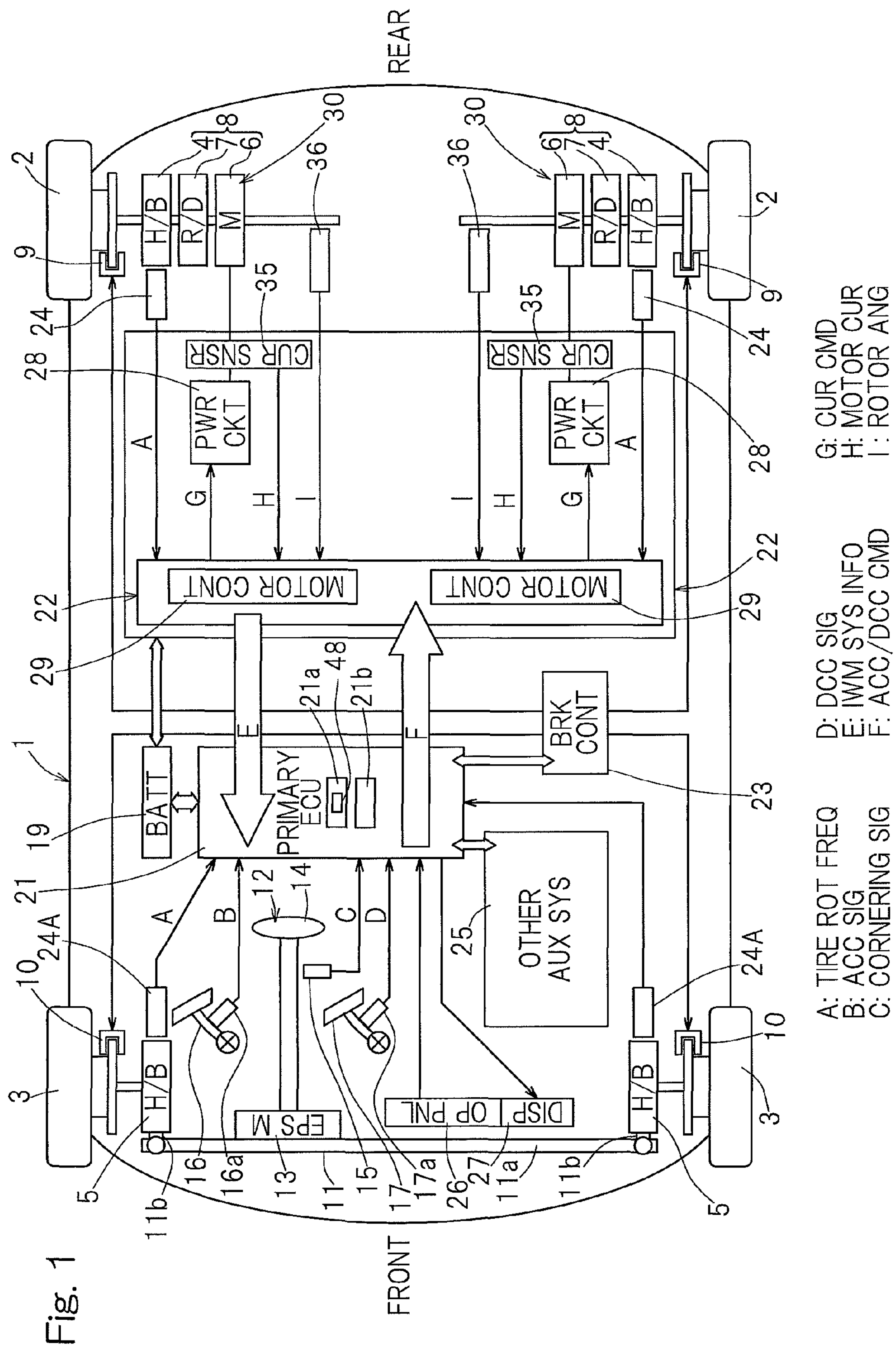
FIG. 1 is a block diagram of a schematic configuration of an electric vehicle, as viewed from top, according to an embodiment of the present invention.
Figure 2:
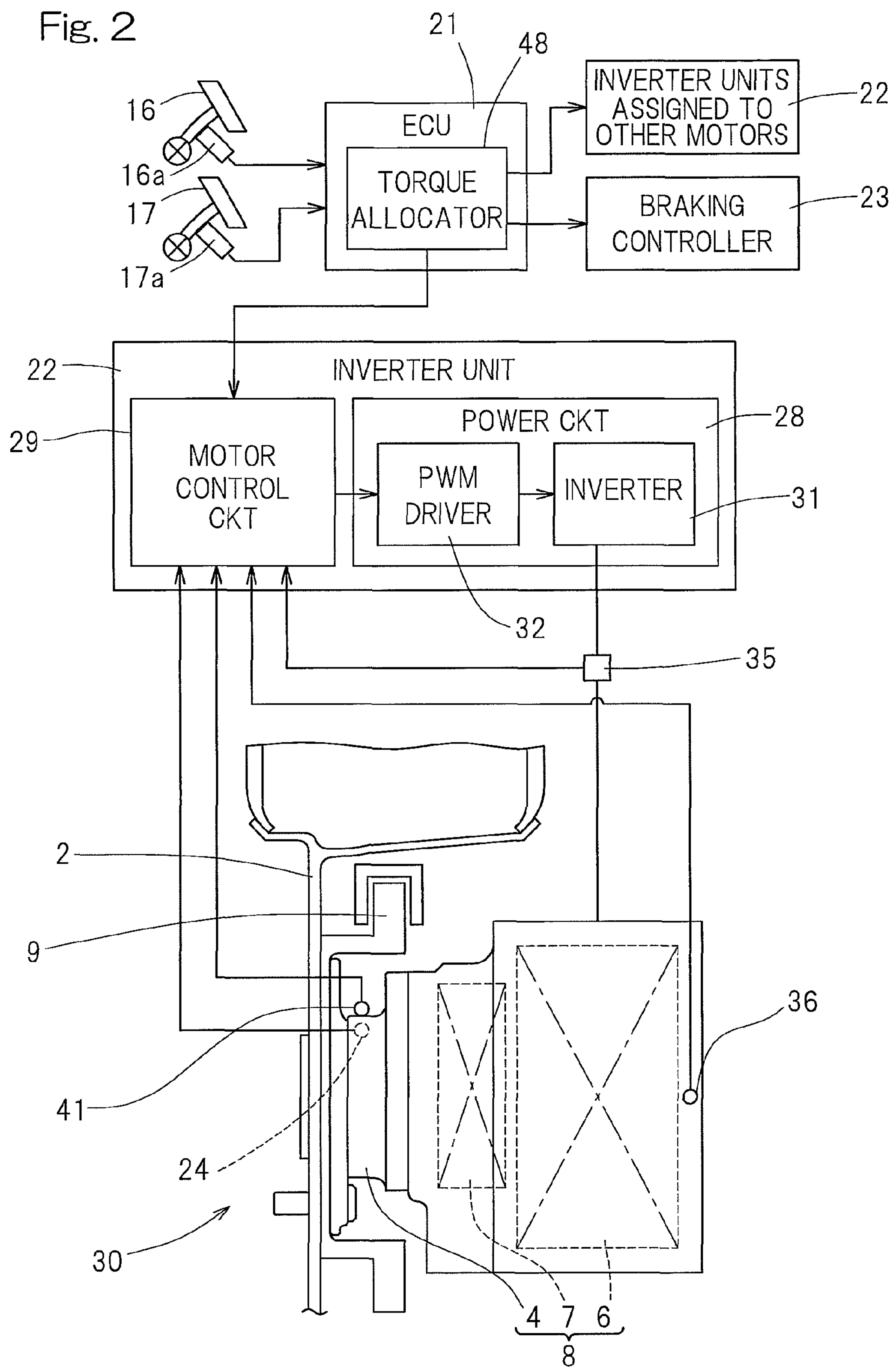
FIG. 2 is a block diagram of a schematic configuration of an in-wheel motor unit for the electric vehicle.

An embodiment of the present invention will now be described in connection with FIG. 1 to FIG. 12. The illustrated electric vehicle is a four-wheel vehicle such as shown in FIG. 1 that includes a vehicle body 1 with left and right rear wheels and left and right front wheels, with the rear wheels being drive wheels 2 and the front wheels being steered driven wheels 3. The drive wheels 2 and the driven wheels 3, both equipped with tires, are supported by the vehicle body 1 via respective wheel bearing units 4, 5. In FIG. 1, the wheel bearing units 4, 5 are labeled with "H/B" which is an abbreviation for hub bearing. The left and right drive wheels 2, 2 are driven by respective independent traction motor units 6, 6. Rotation of a motor unit 6 is transmitted via a reducer unit 7 and a wheel bearing unit 4 to a wheel 2. The motor unit 6, the reducer unit 7 and the wheel bearing unit 4 are integrally assembled with each other to form an in-wheel motor drive system 8. The in-wheel motor drive system 8 as shown in FIG. 2 is partly or entirely disposed within the drive wheel 2. The motor unit 6 may, without the interposition of the reducer unit 7, directly drive a drive wheel 2 into rotation. Each in-wheel motor drive system 8, together with an inverter unit 22 which will be discussed later in connection with FIG. 1, forms an in-wheel motor unit 30. The drive wheels 2 and the driven wheels 3 are equipped with respective electrically driven mechanical friction brakes 9, 10.

The left and right front steered wheels 3, 3 are turnable via a turning mechanism 11 and are steered with a steering mechanism 12. The turning mechanism 11 includes left and right knuckle arms 11*b*, 11*b* holding the respective wheel bearing units 5 and also includes a tie rod structure 11*a* configured to be laterally displaced to change the angles of the left and right knuckle arms 11*b*, 11*b*. The lateral movement of the turning mechanism 11 may be caused by a command from the steering mechanism 12, which drives an EPS (Electric Power Steering) motor 13, and via a rotary to linear motion converter mechanism (not shown). A steering angle sensor 15 is configured to sense a steering angle. The output of the steering angle sensor 15 is sent to the ECU 21 in which the sensed information may be used to generate an accelerating/decelerating command for left and right drive wheels 2, 2.

A control system will be briefly discussed. The illustrated vehicle body 1 is equipped with an ECU 21 which is a primary electronic control unit configured to perform general control of the vehicle, an inverter unit 22 configured to perform control of the traction motor units 6 according to commands from the ECU 21, and a braking controller unit 23. The ECU 21 may include a computer, programs that may be executed by the computer, and various electronic circuits.

The ECU 21 may be generally divided, in terms of their functions, into a drive control subunit 21 a that performs drive-related controls and a general control subunit 21*b* that performs other controls. The drive control subunit 21*a* may include a torque allocator 48 that is configured to generate an accelerating/decelerating command in the form of a torque command value, which will influence the traction motor units 6, 6 of the left and right drive wheels 2, 2, based on an accelerating signal produced from an accelerator manipulation unit 16, a decelerating signal produced from a brake manipulation unit 17, and a cornering signal produced from the steering angle sensor 15, and to send the accelerating/decelerating command to the inverter unit 22. The torque allocator 48 may be configured to, in response to a decelerating signal produced from the brake manipulation unit 17, generate a braking torque command allocated to regenerative braking of the motor unit 6 and a braking torque command allocated to the operation of the mechanical brakes 9, 10. The braking torque command allocated to regenerative braking is taken into account in the generation of the accelerating/decelerating command in the form of a torque command value, which will influence the traction motor units 6, 6 of the left and right drive wheels 2, 2. The braking torque command allocated to the operation of the mechanical brakes 9, 10 is sent to the braking controller unit 23.

In addition, the torque allocator 48 may be configured to correct the accelerating/decelerating command, based on information indicating the rotational frequency of tires produced from rotation sensors 24, 24A that are operatively associated with the wheel bearing units 4, 5 for the respective wheels 2, 3 and/or information produced from various sensors that may be mounted to the vehicle. The accelerator manipulation unit 16 includes an accelerator pedal and a sensor 16*a* configured to sense the depression of the accelerator pedal to generate the aforementioned accelerating signal. The brake manipulator unit 17 includes a brake pedal and a sensor 17*a* configured to sense the depression of the brake pedal to generate the aforementioned decelerating signal.

The general control subunit 21*b* of the ECU 21 is configured to control various auxiliary systems 25, process input signals from an operation panel 26 on a console, cause a display 27 to show information, and/or etc. Examples of the auxiliary systems 25 include an air conditioner, a lamp, a wiper, a GPS, and an airbag. In FIG. 1, the auxiliary systems 25 are indicated in general by a single block.

The braking controller unit 23, which may include electronic circuits and/or a microcomputer, is configured to send a braking command to the mechanical brakes 9, 10 equipped to the drive wheels 2 and driven wheels 3, respectively, according to commands related to braking received from the ECU 21. Commands related to braking produced from the primary ECU 21 may include, other than commands generated based on the decelerating signal produced from the brake manipulator unit 17, a command generated by a safety enhancement subunit that may be included in the ECU 21. The braking controller unit 23 may also include an anti-lock-braking system.

The inverter unit 22 includes a power circuitry 28, which may be provided one for each of the motor units 6, and a motor control circuitry 29 configured to control the power circuitry/circuitries 28. A common motor control circuitry 29 may be provided for different power circuitries 28. Independent motor control circuitries 29 may be provided for respective different power circuitries 28. Such a common motor control circuitry 29 will be configured to control the different power circuitries 28 independently of each other, for example, to achieve different motor torques. The motor control circuitry 29 may be configured to send various information related to the in-wheel motor drive system 8 (which may be referred to as "IWM system information") held by the motor control circuitry 29, such as a variety of detected values or various control values, to the ECU 21.

In the embodiment under discussion, the motor control circuitry 29 is provided one for each power circuitry 28. Furthermore, an inverter unit 22 which includes one motor control circuitry 29 and one power circuitry 28, together with an in-wheel motor drive system 8 which includes a motor unit 6 that can be controlled by the inverter unit 22, forms the aforementioned in-wheel motor unit 30.

FIG. 2 is a block diagram of a schematic configuration of the in-wheel motor unit 30. The power circuitry 28 of the illustrated inverter unit 22 includes an inverter 31 configured to convert a DC power from a battery unit 19 (FIG. 1) into a three-phase AC power used to drive the motor unit 6 and also includes a PWM driver 32 configured to control the inverter 31. The motor unit 6 may include a three-phase synchronous motor such as an IPM (Interior Permanent Magnet) synchronous motor. The inverter 31 may include a plurality of semiconductor switching devices (not shown). The PWM driver 32 may be configured to perform pulse width modulation on a received current command by generating ON/OFF commands to the semiconductor switching devices.

The motor control circuitry 29 may include a computer, programs that may be executed by the computer, and various electronic circuits. The motor control circuitry 29 may be configured to receive the accelerating/decelerating command such as a torque command from the ECU 21 which serves as an upper-level control unit, convert the accelerating/decelerating command into a current command, and send the current command to the PWM driver 32 of the power circuitry 28. The motor control circuitry 29 may be configured to obtain a motor current that flows from the inverter 31 to the motor unit 6, with a current sensor 35, and perform a current feedback control. A rotational angle of a motor rotor in the motor unit 6 may be obtained, with an angle sensor 36, to carry out such a feedback current control based on the obtained rotational angle, such as a vector control.

Referring to FIG. 3, in the embodiment under discussion, the motor control circuitry 29 includes a slip ratio estimator 42, a disturbance observer 43, an applied torque estimator 44, a coefficient of friction estimator 45, a maximum acceptable torque determiner 46 and a motor torque command value limiter 47 as described in detail below.

The slip ratio estimator 42 may estimate a slip ratio λ of a drive wheel 2 on a road surface, based on a detection value indicating a travel speed of the vehicle and a rotational frequency N2 (rad/s) of the drive wheel. In the embodiment under discussion, such a detection value indicating a travel speed of the vehicle is defined by a rotational frequency N1 (rad/s) of a driven wheel, as determined with a rotation sensor 24A assigned to a driven wheel 3. Note that the travel of a vehicle causes the rotation of driven wheel(s) 3. Hence, a rotational frequency N1 of the driven wheel 3 can be considered as a travel speed of the vehicle. The rotational frequency N2 of the drive wheel may be determined based on the output of a rotation sensor 24 assigned to a drive wheel 2.

A slip ratio λ may be determined according to the following equation:

$$\lambda=(N2-N1)/N1$$

In other words, the slip ratio λ may correspond to a value obtained by calculating a difference between a rotational frequency N2 of a drive wheel and a rotational frequency N1 of a driven wheel and dividing the resulting difference by the rotational frequency N1 of a driven wheel.

The disturbance observer 43 may determine an estimate ^Te of a torque that is attributable to external force that acts on the vehicle, based on the detection value indicating a travel speed of the vehicle and the motor torque command value Tm. (The symbol "^" used herein that precedes a reference sign denotes an estimate or an estimated value. This particular symbol "^" may often be omitted.) For example, such an estimate ^Te of a torque that is attributable to external force may correspond to an estimate of a torque that acts on the vehicle when, for example, the vehicle is going up a slope. As can be seen from the illustration of the downstream of the motor unit 6 in FIG. 3, the sum of a torque Te attributable to external force and a wheel torque Tm attributable to the operation of the motor unit 6 becomes a torque that is actually applied to the drive wheel 2. Note that the disturbance observer 43 may determine an estimate ^Te of such a torque Te that is attributable to external force.

Similarly to the slip ratio estimator 42, the disturbance observer 43 may use the detection value indicating a travel speed of the vehicle which may be defined by a rotational frequency N1 (rad/s) of a driven wheel, as determined with a rotation sensor 24A assigned to a driven wheel 3. The motor torque command value Tm may be a motor torque command value that is generated based on signals produced from an acceleration manipulation unit 16 and a deceleration manipulation unit 17. The acceleration manipulation unit 16 may include an accelerator pedal. In particular, the motor torque command value Tm may be produced from the torque allocator 48 and may subsequently be passed through the motor torque command value limiter 47.

The disturbance observer 43 may include an inertia divider 43*a* configured to divide the motor torque command value Tm by a moment J of inertia of the vehicle, to produce a calculation result. The disturbance observer 43 may include an integrator 43*b* configured to calculate an integral of the calculation result, to determine an estimate ^N1 of rotational frequency of a driven wheel when the vehicle is traveling on level ground. The disturbance observer 43 may include a calculator 43*c* configured to calculate a difference between the estimate ^N1 of rotational frequency of a driven wheel and an actual rotational frequency N1 of the driven wheel. The disturbance observer 43 may include a differentiator 43*d* configured to calculate a derivative of the difference. The disturbance observer 43 may include a inertia multiplier 43*e* configured to perform multiplication to produce the estimate ^Te of a torque that is attributable to external force.

The applied torque estimator 44 may estimate an entire torque T applied to the drive wheel 2, based on (i) the motor torque command value Tm and (ii) the torque ^Te estimated by the disturbance observer 43 that is attributable to external force. In particular, the applied torque estimator 44 may include a calculator 44*a* configured to calculate a sum of (i) the motor torque command value Tm and (ii) the torque ^Te estimated by the disturbance observer 43 that is attributable to external force, to determine an estimate ^T of an entire torque applied to the drive wheel 2. The calculator 44*a* of the applied torque estimator 44 may be configured to subtract from the sum a brake torque Tb for the drive wheel 2 that is attributable to the operation of a mechanical brake 9 that may be equipped to the drive wheel 2. In other words, the calculator 44*a* may be configured to perform summation of (i) the motor torque command value Tm and (ii) the torque ^Te estimated by the disturbance observer 43 that is attributable to external force and to perform subtraction of the resulting sum with the brake torque Tb, to determine an estimate ^T of an entire torque applied to the drive wheel 2. The brake torque Tb may be defined by a braking torque command value allocated to the operation of the brake 9 by the torque allocator 48. In a variant, the brake torque Tb may be defined by the value of a brake torque generated by the brake 9, as determined with a sensor (not shown) that may be associated with the brake 9.

Note that a brake torque attributable to regenerative braking may be included in the motor torque command value Tm that may be produced from the torque allocator 48. Instead of using such a motor torque command value Tm, the applied torque estimator 44 may use a motor current or motor current value that may be sensed by the current sensor 35 that may be associated with the motor unit 6. Such a motor current or motor current value may be converted into a motor torque or motor torque value, to allow for performing the aforementioned calculation.

The coefficient of friction estimator 45 may estimate a coefficient μ of friction between a road surface and a tire of the drive wheel 2, based on the torque T estimated by the applied torque estimator 44 and the slip ratio λ estimated by the slip ratio estimator 42. The coefficient of friction estimator 45 may be configured to use a first table 45*a* to estimate the coefficient μ of friction.

Figure 4:
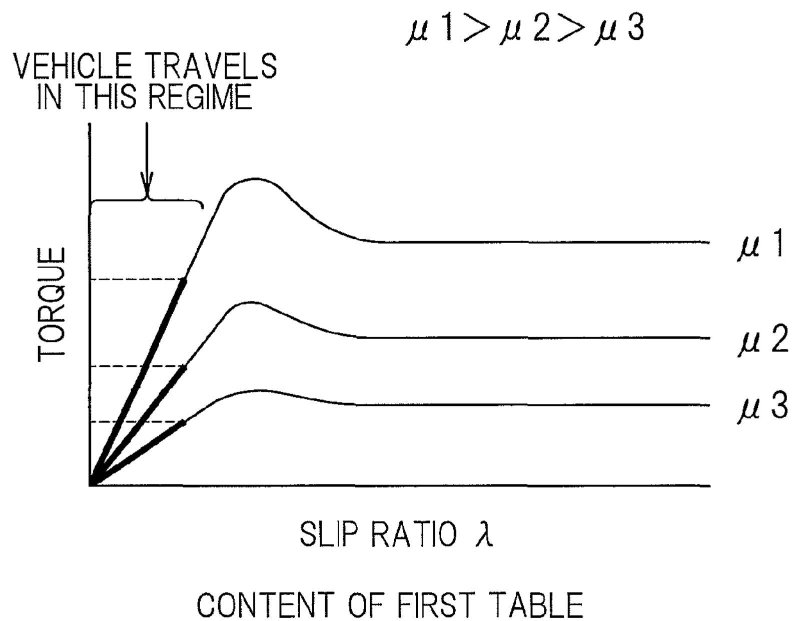
FIG. 4 is a graph showing a content of a first table that may be included in the motor control circuitry.

As shown in the graph of FIG. 4, the first table 45*a* may contain a plurality of relations between a slip ratio λ and a torque T, with each of the relations corresponding to a given value for the coefficient μ of friction. For illustration purposes, the graph only shows three curves of relation between a slip ratio λ and a torque T with the three curves corresponding to three values μ1, μ2, μ3 for the coefficient μ of friction, but the first table 45*a* may normally contain a large number of curves of relation between a slip ratio λ and a torque T with the curves corresponding to an accordingly large number (e.g., tens or thousands) of values for the coefficient μ of friction. As shown in FIG. 4, each of the curves typically includes a segment where the torque T increases in proportion with the slip ratio λ, a segment where the torque T decreases while the slip ratio λ increases, and a segment where the torque T remains substantially constant regardless of the slip ratio λ. The coefficient of friction estimator 45 may be configured to use, out of such a curve of relation, a segment (indicated by a thick line) where the torque T increases in proportion with the slip ratio λ to estimate a coefficient μ of friction.

Referring to FIG. 3, the maximum acceptable torque determiner 46 may determine, according to a predefine rule or relation, a maximum acceptable torque Tmax, based on the coefficient μ of friction estimated by the coefficient of friction estimator 45 and a vertical load component ˆFz acting on the drive wheel 2. The vertical load component ˆFz may be determined based on a detection value produced by the load sensor 41. For example, the maximum acceptable torque Tmax may be determined according to the following equation:

$$\text{maximum acceptable torque } Tmax=\mu\times\hat{}Fz$$

The predefine rule or relation that may be used by the maximum acceptable torque determiner 46 may be defined by a second table 46*a*.

Figure 5:
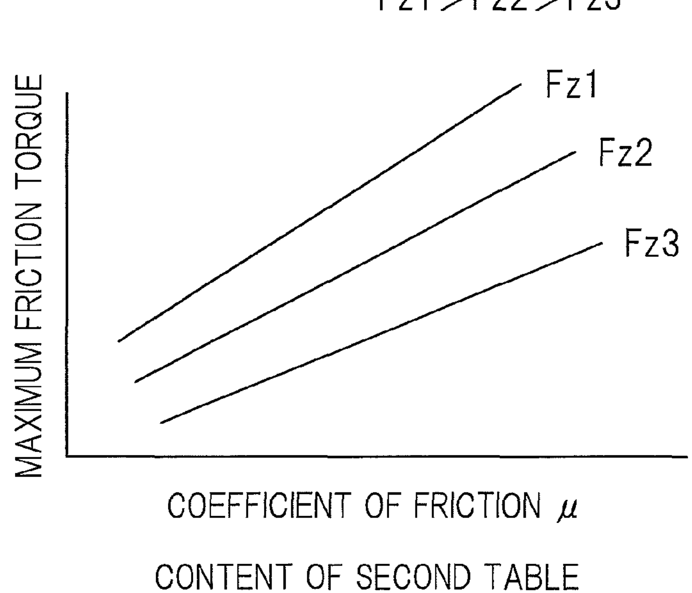
FIG. 5 is a graph showing a content of a second table that may be included in the motor control circuitry.

Referring to FIG. 5, the graph illustrates an example of the content of the second table 46*a*. As shown in the graph of FIG. 5, the second table 46*a* may contain a plurality of relations between a coefficient μ of friction and a maximum acceptable torque Tmax, with each of the relations corresponding to a given value for the vertical load component Fz. For illustration purposes, the graph only shows three curves of relation between a coefficient μ of friction and a maximum acceptable torque Tmax with the three curves corresponding to three values Fz1, Fz2, Fz3 for the vertical load component, but the second table 46*a* may normally contain a large number of curves of relation between a coefficient μ of friction and a maximum acceptable torque Tmax with the curves corresponding to an accordingly large number (e.g., tens or thousands) of values for the vertical load component Fz.

Referring to FIG. 3, the motor torque command value limiter 47 may limit, based on the maximum acceptable torque Tmax determined by the maximum acceptable torque determiner 46, the motor torque command value Tm to the motor unit 6 that may be generated responsively to the acceleration manipulation unit 16 and the deceleration manipulation unit 17, such that the motor torque command value Tm does not exceed the maximum acceptable torque Tmax. The motor torque command value limiter 47 may comprise a torque limiter.

Slip-responsive control according to the aforementioned configuration will now be discussed. Referring to FIG. 3, the slip ratio estimator 42 may estimate a slip ratio λ of a drive wheel 2 on a road surface, based on a detection value indicating a travel speed of the vehicle (i.e., rotational frequency N1 of a driven wheel) and a rotational frequency N2 of the drive wheel. The disturbance observer 43 may estimate a torque ˆTe that is attributable to external force such as gravitational force that acts on the vehicle, based on the detection value indicating a travel speed of the vehicle (i.e., rotational frequency N1 of a driven wheel) and a motor torque command value Tm.

The applied torque estimator 44 may estimate an entire torque T applied to the drive wheel 2, based on (i) the motor torque command value Tm and (ii) the torque ˆTe estimated by the disturbance observer 43 that is attributable to external force. The coefficient of friction estimator 45 may use the aforementioned first table 45*a* to estimate a coefficient μ of friction between the road surface and a tire of the drive wheel 2, based on the estimated entire torque T applied to the drive wheel 2 and the estimated slip ratio λ.

The maximum acceptable torque determiner 46 may use the aforementioned second table 46*a* to determine a maximum acceptable torque Tmax, based on the estimated coefficient μ of friction and a vertical load component ˆFz acting on the drive wheel 2. The motor torque command value limiter 47 may limit, based on the determined maximum acceptable torque Tmax, the motor torque command value Tm to a motor unit 6 that may be produced from the torque allocator 48 that may be included in the ECU 21, such that the motor torque command value Tm does not exceed the maximum acceptable torque Tmax.

In this way, a coefficient of friction μ between a road surface and a tire of the drive wheel 2 may be estimated based on the motor torque command value Tm, an estimate ˆTe of torque estimated by the disturbance observer 43 attributable to external force that may be due to or may result from, for example, the body weight of the vehicle, and an estimated slip ratio λ. A maximum acceptable torque Tmax may be determined based on the estimated coefficient μ of friction and a vertical load component ˆFz, to perform torque limitation such that the motor torque command value Tm does not exceed the maximum acceptable torque Tmax. This can properly preventing possible slip of tire(s) regardless of, for example, various road conditions, and can also ensure such prevention of possible slip without having to undesirably hinder the travel performance of the vehicle to prevent such slip.

In the aforementioned configuration, a load sensor 41 may be provided which is configured to determine the vertical load component Fz acting on the drive wheel 2, wherein the load sensor 41 may be mounted on the wheel bearing unit 4 Such a configuration of a load sensor 41 being mounted on the wheel bearing unit 4 enhances the accuracy in determining the vertical load component Fz acting on the drive wheel 2, thus enabling more proper determination of the maximum acceptable torque Tmax. Such a configuration can also realize a smaller configuration to determine a load. Furthermore, such a configuration allows for pre-mounting the wheel bearing unit 4 on a load sensor 41, thus providing a load sensor-equipped wheel bearing unit such as shown in FIG. 2. This can eliminate the step of mounting a load sensor 41 on the wheel bearing unit 4 in an assembly process of the vehicle.

A particular configuration that the in-wheel motor drive system 8 may take will now be discussed in connection with FIG. 6 to FIG. 8. The illustrated in-wheel motor drive system 8 includes a wheel bearing unit 4, a motor unit 6 and a reducer unit 7 interposed between the wheel bearing unit 4 and the motor unit 6, in which the hub of a drive wheel 2 supported by the wheel bearing unit 4 is coaxially coupled with a rotational output shaft 74 of the motor unit 6. The illustrated reducer unit 7 includes a cycloidal reducer which includes a rotational input shaft 82 coaxially connected to the rotational output shaft 74 of the motor unit 6. The rotational input shaft 82 has eccentric segments 82*a*, 82*b*. The cycloidal reducer also includes curvilinear plates 84*a*, 84*b* mounted via respective bearings 85 to the eccentric segments 82*a*, 82*b*, in such a way to transmit the eccentric motions of the curvilinear plates 84*a*, 84*b* in the form of a rotary motion to the wheel bearing unit 4. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

The wheel bearing unit 4 includes an outer member 51 having an inner periphery formed with a plurality of rows of raceway surfaces 53, an inner member 52 having an outer periphery formed with raceway surfaces 54 held in face to face relation to those raceway surfaces 53, and a plurality of rows of rolling elements 55 that are interposed between the raceway surfaces 53 of the outer member 51 and the raceway surfaces 54 of the inner member 52. The inner member 52 concurrently serves as a hub for mounting a drive wheel. The illustrated wheel bearing unit 4 includes a double row angular contact ball bearing, in which the rolling elements 55 are in the form of balls rollingly retained by a retainer 56 that is provided one for each row of the balls. The raceway surfaces 53 and 54 have arcuate cross sectional shapes and are formed to have respective contact angles held in back-to-back relation with each other. The outer member 51 and the inner member 52 define an annular bearing space therebetween, and an outboard end of the annular bearing space is sealed by a sealing member 57.

The outer member 51, which serves as a stationary member, is of one piece construction having a flange 51*a* for attaching to an outboard housing 83*b* of the reducer unit 7. The flange 51*a* has bolt insertion holes 64 formed at a plurality of circumferential locations thereof. The housing 83*b* has bolt receiving holes 94 that are internally threaded at locations thereof corresponding to the respective bolt insertion holes 64. The outer member 51 can be mounted to the housing 83*b* by screwing into the bolt receiving holes 94 the mounting bolts 65 that are pre-inserted in the bolt insertion holes 64.

The inner member 52, which serves as a rotational member, includes an outboard member 59 having a hub flange 59*a* for attaching a wheel. The inner member 52 also includes an inboard member 60 which has an outboard side fitted to an inner periphery of the outboard member 59 and which is crimped to be integrated with the outboard member 59. The outboard member 59 and the inboard member 60 have the corresponding rows of the raceway surfaces 54 formed thereon. The inboard member 60 has a center thereof formed with a through bore 61. The hub flange 59*a* has force-fitting holes 67 at a plurality of circumferential locations thereof for receiving corresponding hub bolts 66. The outboard member 59 has a cylindrical pilot portion 63 for guiding a drive wheel and brake components (both not shown), which is located in the vicinity of the root of the hub flange 59*a* of the outboard member 59 and is protruding towards the outboard side. A cap 68 closing an outboard end of the through bore 61 is fitted to an inner periphery of the pilot portion 63.

The illustrated reducer unit 7 includes a cycloidal reducer as described. As shown in FIG. 7, the cycloidal reducer includes two curvilinear plates 84*a*, 84*b*, each having an outer contour defined by a smoothly corrugated trochoidal curve, that are mounted via respective bearings 85 to the eccentric segments 82*a*, 82*b* of the rotational input shaft 82. A plurality of outer pins 86 are fitted to the housing 83*b* to directly or indirectly guide, along the outer peripheries thereof, the eccentric motions of the curvilinear plates 84*a* and 84*b*. A plurality of inner pins 88, which are fitted to the inboard member 60 of the inner member 52, are inserted to a plurality of corresponding, round through holes 89 formed in each of the curvilinear plates 84*a* and 84*b*, to directly or indirectly engage with the through holes 89. The rotational input shaft 82 is splinedly connected to the rotational output shaft 74 (FIG. 6) of the motor unit 6 for co-rotation. As shown in FIG. 6, the rotational input shaft 82 is supported on both sides thereof, via two bearings 90, by an inboard housing 83*a* and by an inner diameter surface of the inboard member 60 of the inner member 52, respectively.

Rotation of the rotational output shaft 74 of the motor unit 6 causes the curvilinear plates 84*a*, 84*b*, associated with the rotational input shaft 82 that co-rotates with the rotational output shaft 74, to make eccentric motions. The eccentric motions of the curvilinear plates 84*a*, 84*b* are, through the inner pins 88 directly or indirectly engaging with the through holes 89, transmitted in the form of a rotary motion to the inner member 52. The speed of rotation of the inner member 52 is reduced with respect to that of rotation of the rotational output shaft 74. For example, a single-stage reducer unit having such a configuration can achieve a reduction ratio of 1/10 or greater.

The two curvilinear plates 84*a*, 84*b* are mounted, 180° out of phase with each other, to the eccentric segments 82*a* and 82*b* of the rotational input shaft 82, so that the eccentricity of the motions of the curvilinear plates 84*a*, 84*b* can be cancelled. Counterweights 91 (FIG. 6) associated with the respective eccentric segments 82*a*, 82*b*, are each disposed at a side of the corresponding one of the eccentric segments 82*a*, 82*b*, in such a way that the counterweights 91 face each other across the eccentric segments 82*a*, 82*b* while each of the counterweights 91 being displaced in a direction opposite to the direction of displacement of the corresponding one of the eccentric segments 82*a*, 82*b*. In this way, vibrations that may be caused by the curvilinear plates 84*a*, 84*b* can be cancelled out.

Figure 8:
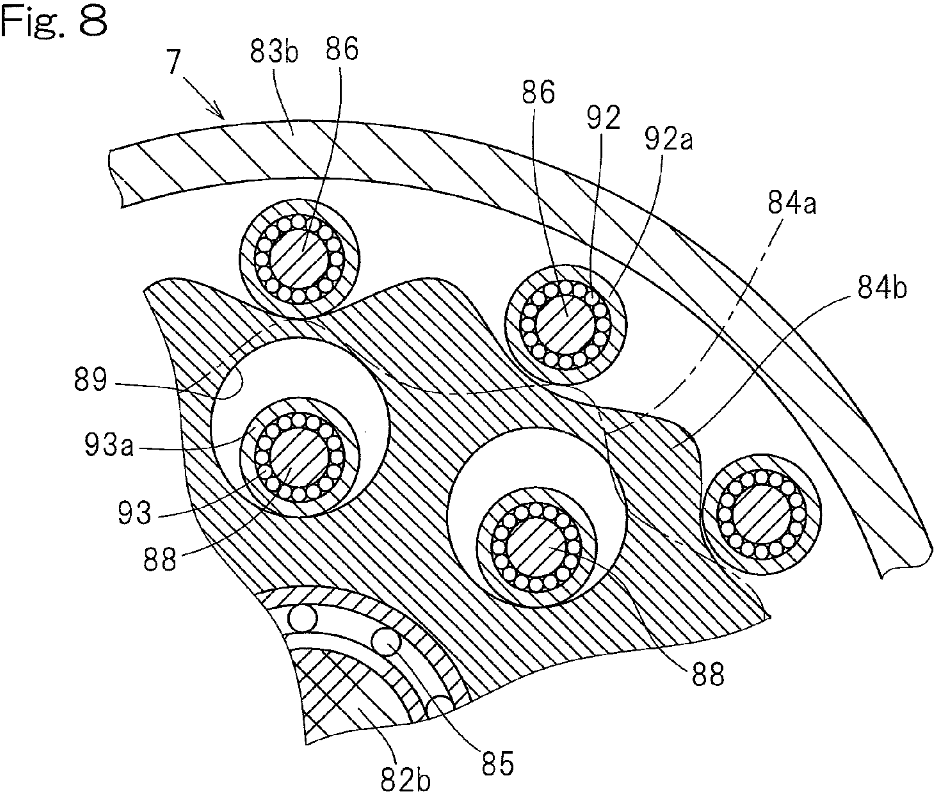
FIG. 8 is a fragmentary enlarged cross sectional view of FIG. 7.

As shown on an enlarged scale in FIG. 8, bearings 92 and bearings 93 may be fitted to the outer pins 86 and the inner pins 88, respectively. The outer rings 92*a* of the bearings 92 are in rolling contact with the outer peripheries of the curvilinear plates 84*a*, 84*b*, while the outer rings 93*a* of the bearings 93 are in rolling contact with the inner peripheries of the through holes 89. This can minimize the contact friction between the outer pins 86 and the outer peripheries of the curvilinear plates 84*a*, 84*b* and the contact friction between the inner pins 88 and the inner peripheries of the through holes 89, thus allowing for smoother transmission of the eccentric motions of the curvilinear plates 84*a*, 84*b* in the form of a rotary motion to the inner member 52.

Figure 6:
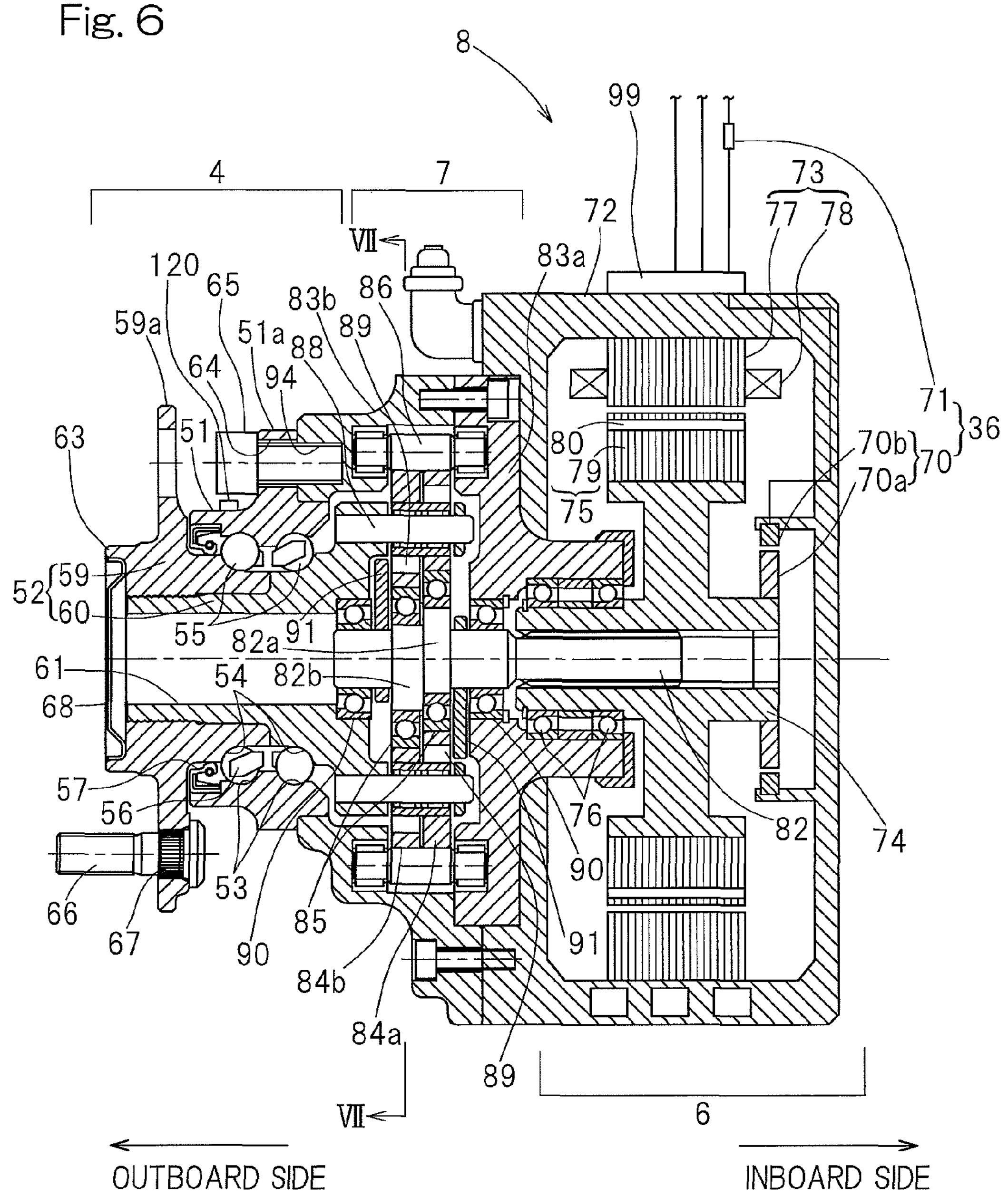
FIG. 6 is a front cut-away view of an in-wheel motor drive system for the electric vehicle.
Figure 7:
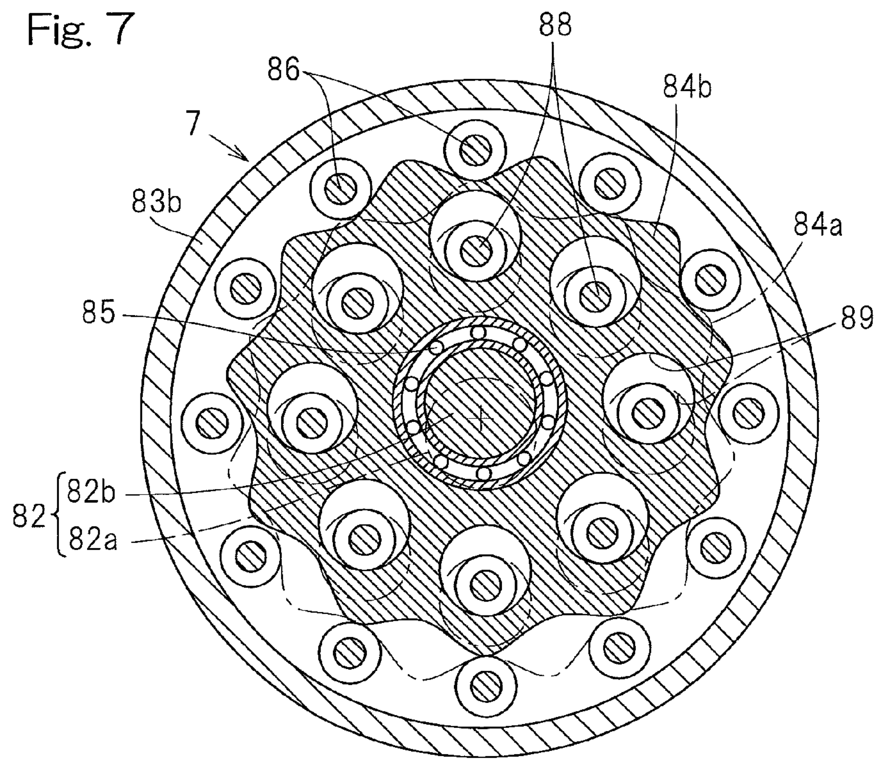
FIG. 7 is a longitudinal cross sectional view of FIG. 6 taken along the line VII-VII.

As shown in FIG. 6, the motor unit 6 includes a radial-gap type, IPM motor that includes a motor stator 73 fitted to a cylindrical motor housing 72 and also includes a motor rotor 75 mounted to the rotational output shaft 74, with a radial gap provided between the motor stator 73 and the motor rotor 75. The rotational output shaft 74 is cantilevered via two bearings 76 to a cylindrical segment of the inboard housing 83*a* of the reducer unit 7.

The motor stator 73 includes a stator core body 77 made of soft magnetic material and also includes coils 78. An outer peripheral surface of the stator core body 77 is fitted to the inner peripheral surface of the motor housing 72. In this way, the stator core body 77 is supported by the motor housing 72. The motor rotor 75 includes a rotor core body 79 mounted onto the rotational output shaft 74 to be coaxial with the motor stator 73 and also includes a plurality of permanent magnets 80 incorporated in the rotor core body 79.

The motor unit 6 may be associated with an angle sensor 36 configured to sense a rotational angle of the motor rotor 75 relative to the motor stator 73. The angle sensor 36 includes an angle sensor body 70 configured to sense signals representing a rotational angle of the motor rotor 75 relative to the motor stator 73 for output and also includes an angle calculation circuit 71 configured to calculate a rotational angle based on the signals produced from the angle sensor body 70. The angle sensor body 70 includes a detectable element 70*a* associated with the outer peripheral surface of the rotational output shaft 74 and also includes a detector element 70*b* associated with the motor housing 72. For example, the detector element 70*b* may be positioned adjacent the detectable element 70*a* in a radially opposed fashion. The detectable element 70*a* and the detector element 70*b* may be positioned adjacent each other in an axially opposed fashion.

Here, the angle sensor 36 may include a magnetic encoder or a resolver. Control of the rotation of the motor unit 6 may be carried out by the aforementioned motor control circuitry 29 (e.g., see FIG. 1 and FIG. 2). To maximize the efficiency of the illustrated motor unit 6, the motor drive controller 33 of the motor control circuitry 29 may be configured to control the timings at which respective phase alternating currents are supplied to the coils 78 of the motor stator 73, based on the rotational angle of the motor rotor 75 relative to the motor stator 73 as sensed by the angle sensor 36.

A connector 99 may be formed at the motor housing 72 for connection of the wires for a motor current in the in-wheel motor drive system 8, wires for various sensors, wires for various commands, and etc.

Figure 9:
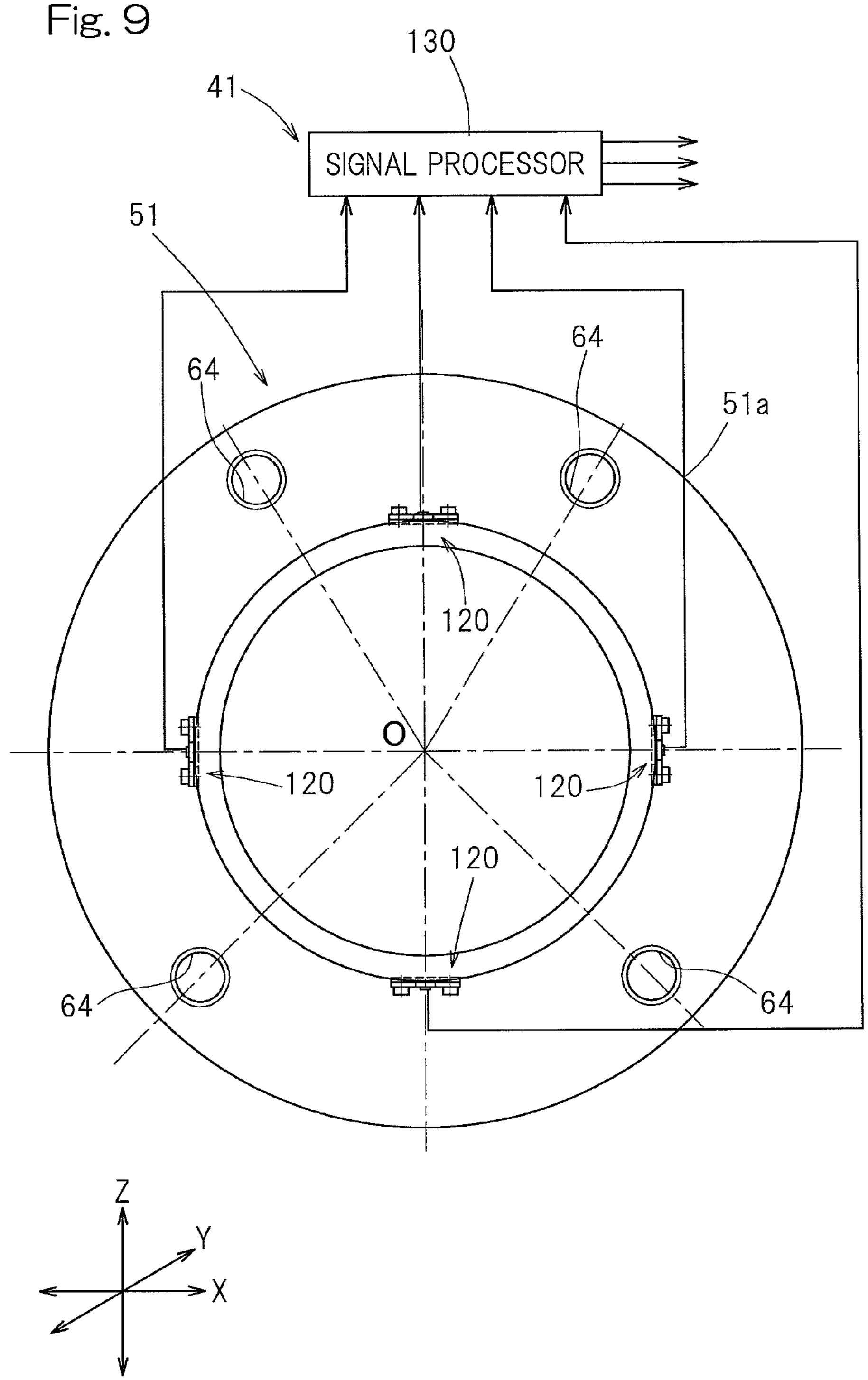
FIG. 9 shows a side view of an outer member of a wheel bearing unit for the electric vehicle, as illustrated in combination with a signal processor unit for load determination.

The aforementioned load sensor 41 as shown in FIG. 2 may include a plurality of sensor units 120 such as shown in FIG. 9 and may also include a signal processor unit 130 configured to process output signals of the sensor units 120. The sensor units 120 may be provided at four locations of an outer diameter surface of the outer member 51 which serves as a stationary member of the wheel bearing unit 4. FIG. 9 illustrates a front view of the outer member 51 as viewed from an outboard side. In the illustrated example, the sensor units 120 are positioned at upper, lower, right and left parts, respectively, of the outer diameter surface of the outer member 51, with the upper and lower parts corresponding to vertical regions relative to a tire in contact with a road surface and the right and left parts corresponding to horizontal regions relative to a tire in contact with a road surface. The signal processor unit 130 may be disposed on or at the outer member 51, or may be included in the motor control circuitry 29 of the inverter unit 22.

The signal processor unit 130 may be configured to compare the outputs of the sensor units 120 provided at four locations and determine, according to predefined equation(s), the respective load components applied to the wheel bearing unit 4—in particular, a vertical load component Fz that acts between a road surface and a tire equipped to the wheel 2, a load component Fx that acts along a direction in which the vehicle travels and that may include a drive force and/or a brake force, and/or an axial load component Fy, for output. Such a configuration where the four sensor units 120 are evenly disposed on upper, lower, right and left parts, respectively, of an outer diameter surface of the outer member 51 such that the four sensor units are positioned to be circumferentially 90° out of phase from each other, with the upper and lower parts corresponding to vertical regions relative to a tire in contact with a road surface and the right and left parts corresponding to horizontal regions relative to a tire in contact with a road surface, allows for more accurate estimation of a vertical load component Fz, a load component Fx that acts along a direction in which a vehicle travels, and/or an axial load component —which may be applied to the wheel bearing unit 4.

A vertical load component Fz may be determined based on comparison between the outputs of the upper and lower sensor units 120. A load component Fx that acts along a direction in which a vehicle travels may be determined based on comparison between the outputs of the rear and front sensor units 120. An axial load component Fy may be determined based on comparison between the outputs of the four sensor units 120. The equation(s) and/or parameter(s) that may be used in determination of the load components Fx, Fy, Fz may be defined based on data values obtained by experiments and/or simulations, to achieve more precise determination of the load component(s). Note that the aforementioned determination may include correction operation(s), which will not be discussed for the purpose of simplicity.

Figure 10:
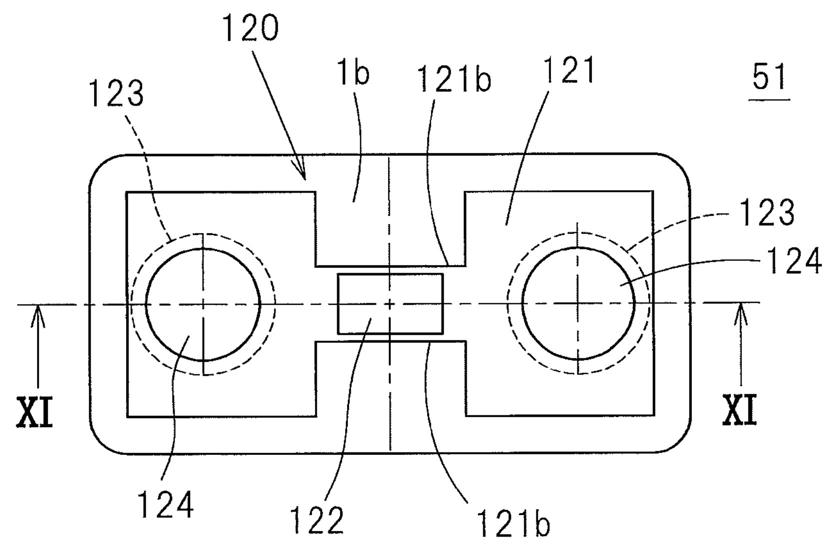
FIG. 10 is an enlarged plan view of a sensor unit for the electric vehicle.
Figure 11:
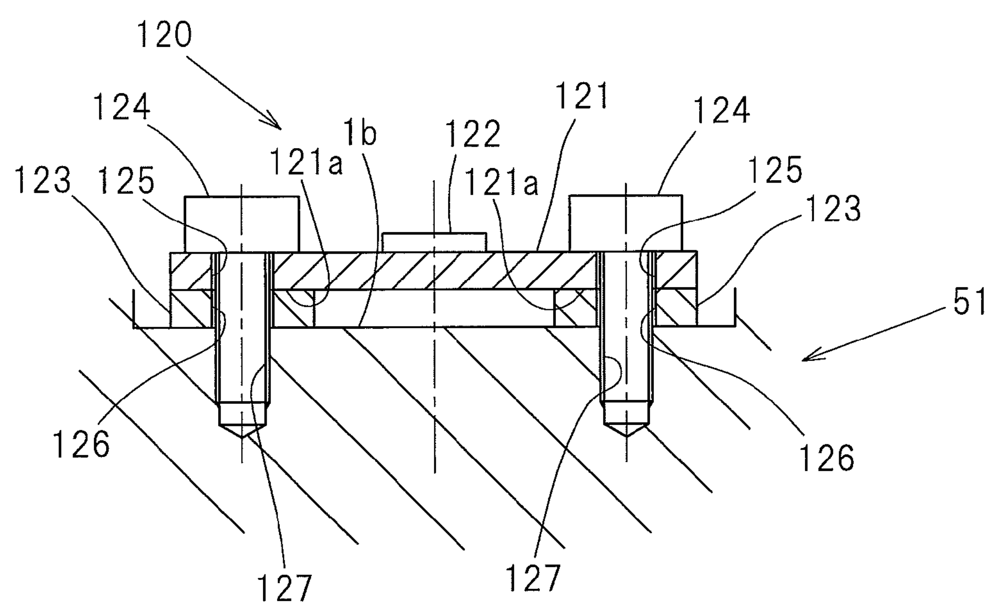
FIG. 11 is a longitudinal cross sectional view of the sensor unit.

As shown in an enlarged plan view of FIG. 10 and an enlarged longitudinal cross sectional view of FIG. 11, each of the sensor units 120 may include a strain generator member 121 and a strain sensor 122 mounted on the strain generator member 121 to sense strain in the strain generator member 121. The strain generator member 121 may comprise a metal plate, such as a steel plate, that has a thickness of 3 mm or smaller and that is elastically deformable, with the metal plate having a shape of a strip having a generally uniform width along its length as viewed on a plan view while also having cutouts 121*b* being formed at a center thereof on opposite sides. The strain generator member 121 may include, at opposite ends, two fixation contact segments 121*a* that are fixedly in contact through respective spacers 123 with an outer diameter surface of the outer member 51. The strain sensor 122 may be affixed on the strain generator member 121 at a location where a larger strain occurs in response to application of load components of various directions. In the illustrated example, the strain sensor 122 is placed on an outer face of the strain generator member 121 so as to be positioned at a center of the strain generator member 121 where the strain sensor 122 is positioned between the cutouts 121*b* formed on opposite sides of the strain generator member 121. In this way, the strain sensor 122 can sense strain in the strain generator member 121 in the vicinity of the cutouts 121*b* along a circumferential direction of the strain generator member 121.

The sensor units 120 may be located with respect to the outer member 51 such that the two fixation contact segments 121*a* of a strain generator member 121 are circumferentially spaced from each other and are positioned on respective axial locations on a common plane, with the fixation contact segments 121*a* being fixedly associated through respective spacers 123, with corresponding bolts 124, to an outer diameter surface of the outer member 51. The bolts 124 are inserted into bolt insertion radial through holes 125 formed in the respective fixation contact segments 121*a*, are passed through bolt insertion holes 126 formed in the spacers 123, and are screwed into threaded holes 127 formed in an outer periphery of the outer member 51.

With such a configuration of fixedly associating the fixation contact segments 121*a* through respective spacers 123 to an outer diameter surface of the outer member 51, a center of the thin-plate, strain generator member 121 where the cutouts 121*b* are formed can be physically separated from an outer diameter surface of the outer member 51, thus facilitating straining deformation of the strain generator member 121 in the vicinity of the cutouts 121*b*. In the illustrated example, the fixation contact segments 121*a* are positioned on respective axial locations which are in the vicinity of an outboard row of raceway surfaces 53 of the outer member 51. The vicinity of an outboard row of raceway surfaces 53 of the outer member 51 used herein refers to a range extending from the center between an inboard row of raceways surfaces 53 and an outboard row of raceway surfaces 53 to the area where the outboard row of raceway surfaces 53 is formed. The outer diameter surface of the outer member 51 may include a flat segment 1*b* with which the spacers 123 are fixedly in contact.

Various types of the strain sensor 122 may be used. For example, the stain sensor 122 may include a metal foil strain gauge. In this case, the strain sensor 122 is typically glued and fixed to the strain generator member 121. The strain sensor 122 may include a thick film resistor on the strain generator member 121.

Figure 12:
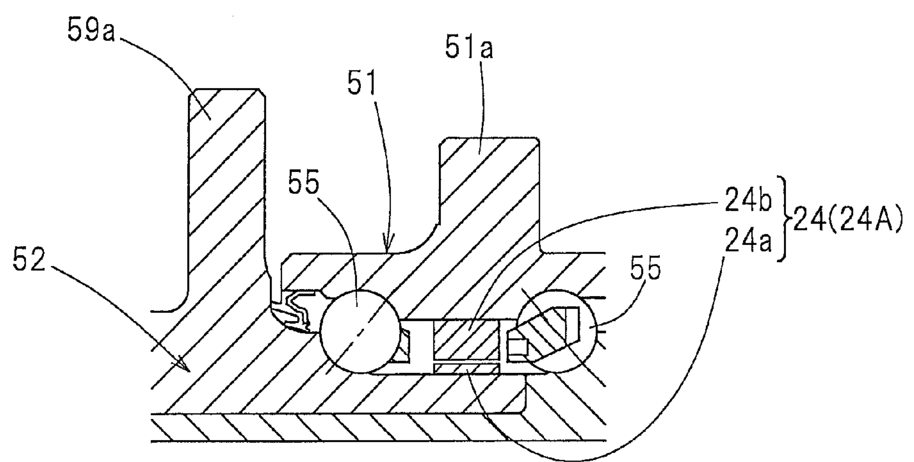
FIG. 12 is a longitudinal cross sectional view of an example of rotation sensor(s) for the electric vehicle.

FIG. 12 illustrates an example of the rotation sensors 24, 24A such as shown in FIG. 1 and FIG. 2. The illustrated rotation sensor 24 or 24A includes a magnetic encoder 24*a* associated with an outer periphery of the inner member 52 of the wheel bearing unit 4 or 5 and also includes a magnetic sensor 24*b* associated with the outer member 51 in face-toface relation with the magnetic encoder 24*a*. The magnetic encoder 24*a* may include a ring-shaped member magnetized with N poles and S poles that alternate with each other along a circumferential direction of the ring-shaped member. In the illustrated example, the rotation sensor 24 or 24A is positioned between the double rows of rolling elements 55, 55. In other embodiments, the rotation sensor 24 or 24A may be positioned at an end of the wheel bearing unit 4 or 5.

In the embodiment under discussion such as shown in FIG. 1 and FIG. 2, the inverter unit 22 includes the motor control circuitry 29. In a variant, the ECU 21 which is a primary electronic control unit may include the motor control circuitry 29. Furthermore, in the embodiment under discussion, the ECU 21 and the inverter unit 22 are provided separate from each other. In a variant, the ECU 21 and the inverter unit 22 may be integrated into a single control unit.

Although the present invention has been described in connection with preferred embodiments with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE SIGNS

1: Vehicle body
2, 3: Wheel
4, 5: Wheel bearing unit
6: Motor unit
7: Reducer unit
8: In-wheel motor drive system
9, 10: Electromechanical brake
21: ECU
22: Inverter unit
24, 24A: Rotation sensor
28: Power circuitry
29: Motor control circuitry
30: In-wheel motor unit
31: Inverter
32: PWM driver
33: Motor drive controller
35: Current sensor
36: Angle sensor
41: Load sensor
42: Slip ratio estimator
43: Disturbance observer
44: Applied torque estimator
45: Coefficient of friction estimator
46: Maximum acceptable torque determiner
47: Motor torque command value limiter

What is claimed is:

1. An electric vehicle comprising:

a motor unit configured to drive a drive wheel;

a motor control circuitry configured to control the motor unit in accordance with a motor torque command value that is generated based on commands produced from an acceleration manipulation unit and a deceleration manipulation unit;

a slip ratio estimator configured to estimate a slip ratio of the drive wheel on a road surface, based on a detection value indicating a travel speed of the vehicle and a rotational frequency of the drive wheel;

a disturbance observer configured to estimate a torque that is attributable to external force that acts on the vehicle, based on the detection value indicating a travel speed of the vehicle and the motor torque command value;

an applied torque estimator configured to estimate an entire torque applied to the drive wheel, based on (i) the motor torque command value or a motor current value of the motor unit and (ii) the torque estimated by the disturbance observer that is attributable to external force;

a coefficient of friction estimator configured to estimate a coefficient of friction between a road surface and a tire of the drive wheel, based on the torque estimated by the applied torque estimator and the slip ratio estimated by the slip ratio estimator;

a maximum acceptable torque determiner configured to determine, according to a predefine rule, a maximum acceptable torque, based on the estimated coefficient of friction and a vertical load component acting on the drive wheel; and a motor torque command value limiter configured to limit, based on the determined maximum acceptable torque, the motor torque command value to the motor unit that is generated responsively to the acceleration manipulation unit and the deceleration manipulation unit.

2. The electric vehicle as claimed in claim 1, further comprising:

a wheel bearing unit; and a load sensor configured to determine the vertical load component acting on the drive wheel, the load sensor being mounted on the wheel bearing unit.

3. The electric vehicle as claimed in claim 1, wherein the motor torque command value limiter comprises a torque limiter.

4. The electric vehicle as claimed in claim 1, further comprising:

a wheel bearing unit;

wherein the motor unit, together with the wheel bearing unit, forms an in-wheel motor drive system that is partly or entirely disposed within the drive wheel, the in-wheel motor drive system including the motor unit and the wheel bearing unit.

5. The electric vehicle as claimed in claim 4, further comprising:

a reducer unit configured to transmit to the drive wheel rotation with a speed that is reduced with respect to that of rotation of the motor unit;

wherein the in-wheel motor drive system also includes the reducer unit.

6. The electric vehicle as claimed in claim 5, wherein the reducer unit comprises a cycloidal reducer.

* * * * *